Feb. 23, 1937.  A. LAMESCH  2,071,411
GAUGE GLASS
Filed June 28, 1934
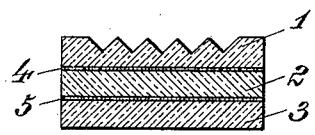
Inventor:
Armand Lamesch
By Owen & Owen
attorneys Patented Feb. 23, 1937

2,071,411

UNITED STATES PATENT OFFICE 2,071,411

GAUGE GLASS

Armand Lamesch, Waldenburg-Altwasser, Germany, assignor to Schlesische Spiegelglas-Manufactur, Carl Tielsch G. m. b. H., Waldenburg-Altwasser, Germany Application June 28, 1934, Serial No. 732,805
In Germany July 11, 1933

2 Claims. (Cl. 73—54)

This invention relates to an inspection glass, preferably for pressure and vacuum containers, and also for receptacles whose contents attack the glass as in water gauges, etc.

The inspection glasses hitherto in use for such purposes consisted, as a rule, of a single piece of glass of suitable composition so as to possess the properties required for meeting the stresses due to corrosion, change of temperature, etc. Glasses of this type are usually hardened. Other known types of sight glasses, though made in one piece, comprise several layers of glass having different coefficients of thermal expansion and are fused into a unit, initial tension of the outer layers, otherwise produced by hardening, being attained by the different contraction of the fused layers during cooling.

These known types of sight glasses are, however, open to the objection that they are too rigid on account of their thickness and thus break easily when placed in holders. Another objection is that the entire glass, which is relatively expensive owing to its composition, has to be replaced if the side thereof coming in contact with the liquid is worn down or has become tarnished.

Other known kinds of sight glasses comprise several layers and a plurality of independent single glasses, the smooth surfaces of which are superposed. Such glasses suffer, however, from the serious drawback because after a short time impurities will enter into the unavoidable space between the layers and interfere with transparency. The entrance of these impurities will be facilitated and the composite glass becomes useless even more quickly because of the constant mutual displacement between the separate glasses due to the different temperatures to which the outer layers are exposed and the resulting different thermal expansion. Furthermore, colored interference bands will appear which render it difficult or impossible to look through such glasses.

The sight glass according to this invention eliminates the above mentioned drawbacks and affords technical and economic advantages which will be described below.

The sight glass according to this invention consists of several layers of single glasses, which are independent from one another and between which layers of a material having approximately the same refractive index as glass, are interposed. These intermediate layers do not effect a firm connection between the single glasses, but merely cause them to adhere to each other without interfering with their freedom of motion relative to one another in case of stresses due especially to different thermal expansion. The intermediate layers consist of a transparent material, which do not solidify even after a long period and which exclude the danger of interference phenomena, and interconnect the individual glasses so as to insure excellent transparency of the entire glass combination even if the surfaces of the single glasses coming into contact with the intermediate layers are not ground and polished.

The single glasses are preferably hardened in a well known manner to enhance the advantages resulting from the combination of two independent separate glasses without any dangerous air gap and particularly to attain a still greater elasticity of the entire combination and thus increase its resistance to mechanical strain. In this way, breaking of the glass while it is placed in a holder will be prevented.

According to this invention, it is no longer necessary to make all the layers of the sight glass, which are independent of one another, from an expensive special glass. It suffices if the innermost layer exposed to corrosion consists of glass of a special composition insuring, for instance, greater resistance to corrosion or a lower coefficient of thermal expansion and having especially a high alumina content, whereas the other layers may be made from a cheaper glass of ordinary composition. In case of wear or tarnish, it is not necessary to replace the entire sight glass but merely the affected single layer which constitutes only a portion of the thickness of the whole glass, so that a considerable economic advantage is attained hereby. It will be understood that not only the innermost layer but all others also may be of different composition.

The cost of producing the glass according to the invention is not higher than that of making a glass of known type having a thickness corresponding to that of the combined layers of the new glass, because the relatively thin-walled single glasses can be worked much better and more easily than such a thick-walled glass.

Troubles due to the difference of the coefficients of thermal expansion of the various layers of glass cannot take place, as the layers remain displaceable relative to one another and retain their independence. This displacement, however, does not cause mutual mechanical stressing and, furthermore, does not permit the entrance of impurities between the layers.

By way of example, the invention is illustrated in the accompanying drawing which shows a sight glass in cross section.

1 is a single glass layer of special composition and known prismatic type. 2 and 3 are single glass layers consisting either of ordinary glass or of glass that is of a different composition from 1. 4 and 5 are intermediate layers of non-drying material having approximately the same refractive index as glass. The composition of the material of which the layers 4 and 5 consists, forms no part of the present invention, but it is to be understood that any material having the desired characteristics may be used, and by way of example, one material which has been found satisfactory for the purpose is a mixture of polymerized vinyl acetate with a softening agent, such as oil of turpentine or castor oil. To facilitate applying this material, it may be diluted with a solvent, such as alcohol, and, if desired, nitrocellulose may be added with a solvent for the same. Material of this general composition is offered on the market under the name "Vinnaphs".

The invention is not restricted to the production of sight glasses for the purposes mentioned above, but combinations according to the invention, which comprise a plurality of single glass layers connected as described yet freely displaceable relative to one another and retaining their independence, may find numerous profitable uses, especially if the units are of different composition.

I claim:—

1. A sight glass for pressure, vacuum and other containers having contents which effect the glass, comprising a plurality of independent layers of glass, and a layer of plastic material interposed between and extending throughout the entire area of each of the opposed faces of said layers of glass to connect the latter, said material having approximately the same refractive index as glass, whereby the sight glass retains its transparency while permitting relative movement of the layers to each other responsive to varying temperature changes.

2. A gauge glass comprising a plurality of independent glass plates, and a layer of transparent material having approximately the same refractive index as glass interposed between adjacent plates, said material being plastic to afford relative movement between said plates under conditions of use.

ARMAND LAMESCH.